United States Patent
Zhou et al.

(10) Patent No.: US 11,051,310 B2
(45) Date of Patent: Jun. 29, 2021

(54) UE INDICATION OF SUPPORTED NUMBER OF TRIGGER STATES

(71) Applicant: QUALCOMM Incorporated, San Diego, CA (US)

(72) Inventors: Yan Zhou, San Diego, CA (US); Tao Luo, San Diego, CA (US); Ruhua He, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/555,547

(22) Filed: Aug. 29, 2019

(65) Prior Publication Data

US 2020/0107314 A1 Apr. 2, 2020

Related U.S. Application Data

(60) Provisional application No. 62/739,418, filed on Oct. 1, 2018.

(51) Int. Cl.
*H04W 72/04* (2009.01)
*H04L 5/00* (2006.01)

(52) U.S. Cl.
CPC ....... *H04W 72/048* (2013.01); *H04W 72/042* (2013.01); *H04W 72/044* (2013.01); *H04W 72/0413* (2013.01); *H04L 5/0035* (2013.01); *H04L 5/0048* (2013.01)

(58) Field of Classification Search
CPC .......... H04W 72/048; H04W 72/044; H04W 72/042; H04W 72/0413; H04W 24/10; H04W 8/24; H04L 5/0035; H04L 5/0048; H04L 5/0094; H04L 5/0023; H04B 7/0628; H04B 17/30
See application file for complete search history.

(56) References Cited

U.S. PATENT DOCUMENTS

| | | | | |
|---|---|---|---|---|
| 9,655,048 B2* | 5/2017 | Liu | ............... | H04L 5/0098 |
| 9,854,520 B2* | 12/2017 | Ghosh | ............... | H04W 52/0216 |
| 10,448,408 B2* | 10/2019 | Nam | ............... | H04L 5/0035 |
| 2017/0135092 A1* | 5/2017 | Seo | ............... | H04L 5/0055 |
| 2017/0264399 A1* | 9/2017 | Li | ............... | H04W 52/0212 |
| 2018/0042028 A1* | 2/2018 | Nam | ............... | H04B 7/0626 |
| 2018/0213430 A1* | 7/2018 | Yokomakura | ............... | H04L 5/0032 |

(Continued)

OTHER PUBLICATIONS

MediaTek, "Remaining Issues in CSI Aacquistion", 3GPP TSG RAN WG1 Meeting #94, Aug. 20-24, 2018, R1-1808263 (Year: 2018).*

(Continued)

*Primary Examiner* — Brian T O Connor
(74) *Attorney, Agent, or Firm* — Patterson+ Sheridan, L.L.P.

(57) ABSTRACT

Certain aspects of the present disclosure provide techniques for a user equipment (UE) indication of a capability of the UE for the supported number trigger states. A method that may be performed by the UE includes providing an indication to a base station (BS) of a maximum number of aperiodic trigger states supported by the UE. The UE receives a configuration or activation of aperiodic trigger states from the BS in accordance with the indication. A method that may be performed by a BS includes receiving the indication from the UE and providing a configuration or activation of aperiodic trigger states to the UE in accordance with the indication.

29 Claims, 9 Drawing Sheets

(56) References Cited

U.S. PATENT DOCUMENTS

| | | | |
|---|---|---|---|
| 2019/0058517 A1* | 2/2019 | Kang | H04L 5/0048 |
| 2020/0235832 A1* | 7/2020 | Lee | H04B 17/336 |
| 2020/0280357 A1* | 9/2020 | Bae | H04L 1/0027 |

OTHER PUBLICATIONS

"3rd Generation Partnership Project; Technical Specification Group Radio Access Network; NR; Medium Access Control (MAC) protocol specification (Release 15)", 3GPP Standard, Technical Specification, 3GPP TS 38.321, 3rd Generation Partnership Project (3GPP), Mobile Competence Centre, 650, Route Des Lucioles, F-06921 Sophia-Antipolis Cedex, France, vol. RAN WG2, No. V15.3.0, Sep. 25, 2018 (Sep. 25, 2018), pp. 1-76, XP051487371, [retrieved on Sep. 25, 2018] * chapter 6.1.3.17 *.

"3rd Generation Partnership Project; Technical Specification Group Radio Access Network; NR; Physical layer procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018], section 1 "Scope", section 5 .1. 2 .1 "Resource allocation in time domain" section 5 .1.2 .2 Resource allocation in frequency domain. Verified and considered with published date of Jun. 2018.

International Search Report and Written Opinion—PCT/US2019/049106—ISA/EPO—dated Nov. 14, 2019.

Mediatek Inc: "Remaining Issues in CSI Aacquisition", 3GPP TSG RAN WG1 Meeting #94, 3GPP Draft; R1-1808263, 3rd Generation Partnership Project (3GPP), Mobile Competence Centre ; 650, Route Des Lucioles ; F-06921 Sophia-Antipolis Cedex; France, vol. RAN WG1, No. Gothenburg, Sweden; Aug. 20, 2018-Aug. 24, 2018, Aug. 11, 2018 (Aug. 11, 2018), 12 Pages, XP051515647, Retrieved from the Internet: URL: URL: http://www.3gpp.org/ftp/tsg%5Fran/WG1%5FRL1/TSGR1%5F94/Docs/R1%2D1808263%2Ezip [retrieved Aug. 10, 2018]. Verified and considered with published date Aug. 2018.

Zte, et al., "Details and Evaluation Results on Beam Indication", 3GPP TSG RAN WG1 Meeting #91, 3GPP Draft; R1-1719538 Details and Evaluation Results on Beam Indication, 3rd Generation Partnership Project (3GPP), Mobile Competence Centre, 650, Route Des Lucioles; F-06921 Sophia-Antipolis Cedex, France, vol. RAN WG1, No. Reno, USA, Nov. 27, 2017-Dec. 1, 2017, Nov. 18, 2017 (Nov. 18, 2017), 11 Pages, XP051369352, Retrieved from the Internet: URL: http://www.3gpp.org/ftp/tsg%5Fran/WG1%5FRL1/TSGR1%5F91/Docs/ [retrieved on Nov. 18, 2017], figures 1, 3, 2. Verified and considered with published date Nov. 2017.

* cited by examiner

UE INDICATION OF SUPPORTED NUMBER OF TRIGGER STATES

CROSS-REFERENCE TO RELATED APPLICATION(S)

This application claims benefit of and priority to U.S. Provisional Patent Application Ser. No. 62/739,418, filed Oct. 1, 2018, herein incorporated by reference in its entirety as if fully set forth below and for all applicable purposes.

INTRODUCTION

Aspects of the present disclosure relate to wireless communications, and more particularly, to techniques for aperiodic channel state information (CSI) reference signal (RS) resources.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects provide a method for wireless communication by a user equipment (UE). The method generally includes providing an indication to a base station (BS) of a number of aperiodic trigger states supported by the UE. The method generally includes receiving an activation of one or more aperiodic trigger states from the BS in accordance with the indication.

Certain aspects provide a method for wireless communication by a BS. The method generally includes receiving an indication from a UE of a number of aperiodic trigger states supported by the UE. The method generally includes providing an activation of one or more aperiodic trigger states to the UE in accordance with the indication.

Certain aspects provide an apparatus for wireless communication. The apparatus generally includes means for providing an indication to a BS of a number of aperiodic trigger states supported by the apparatus. The apparatus generally includes means for receiving an activation of one or more aperiodic trigger states from the BS in accordance with the indication.

Certain aspects provide an apparatus for wireless communication. The apparatus generally includes means for receiving an indication from a UE of a number of aperiodic trigger states supported by the UE. The apparatus generally includes means for providing an activation of one or more aperiodic trigger states to the UE in accordance with the indication.

Certain aspects provide an apparatus for wireless communication. The apparatus generally includes a memory and at least one processor coupled with the memory. The memory and the processor are generally configured to provide an indication to a BS of a number of aperiodic trigger states supported by the apparatus, and to receive an activation of one or more aperiodic trigger states from the BS in accordance with the indication.

Certain aspects provide an apparatus for wireless communication. The apparatus generally includes a memory and at least one processor coupled with the memory. The memory and the processor are generally configured to receive an indication from a UE of a number of aperiodic trigger states supported by the UE, and to provide an activation of one or more aperiodic trigger states to the UE in accordance with the indication.

Certain aspects provide a computer readable medium having computer executable code stored thereon for wireless communication. The computer readable medium generally includes code for providing an indication to a BS of a number of aperiodic trigger states supported by a UE. The computer readable medium generally includes code for receiving an activation of one or more aperiodic trigger states from the BS in accordance with the indication.

Certain aspects provide a computer readable medium having computer executable code stored thereon for wireless communication. The computer readable medium generally includes code for receiving an indication from a UE of a number of aperiodic trigger states supported by the UE. The computer readable medium generally includes code for providing an activation of one or more aperiodic trigger states to the UE in accordance with the indication.

Certain aspects provide a method for wireless communication by a UE. The method generally includes providing an indication to a BS of a number of aperiodic trigger states supported by the UE. The method generally includes receiving a configuration of one or more aperiodic trigger states from the BS in accordance with the indication.

Certain aspects provide a method for wireless communication by a BS. The method generally includes receiving an indication from a UE of a number of aperiodic trigger states supported by the UE. The method generally includes providing a configuration of one or more aperiodic trigger states to the UE in accordance with the indication.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
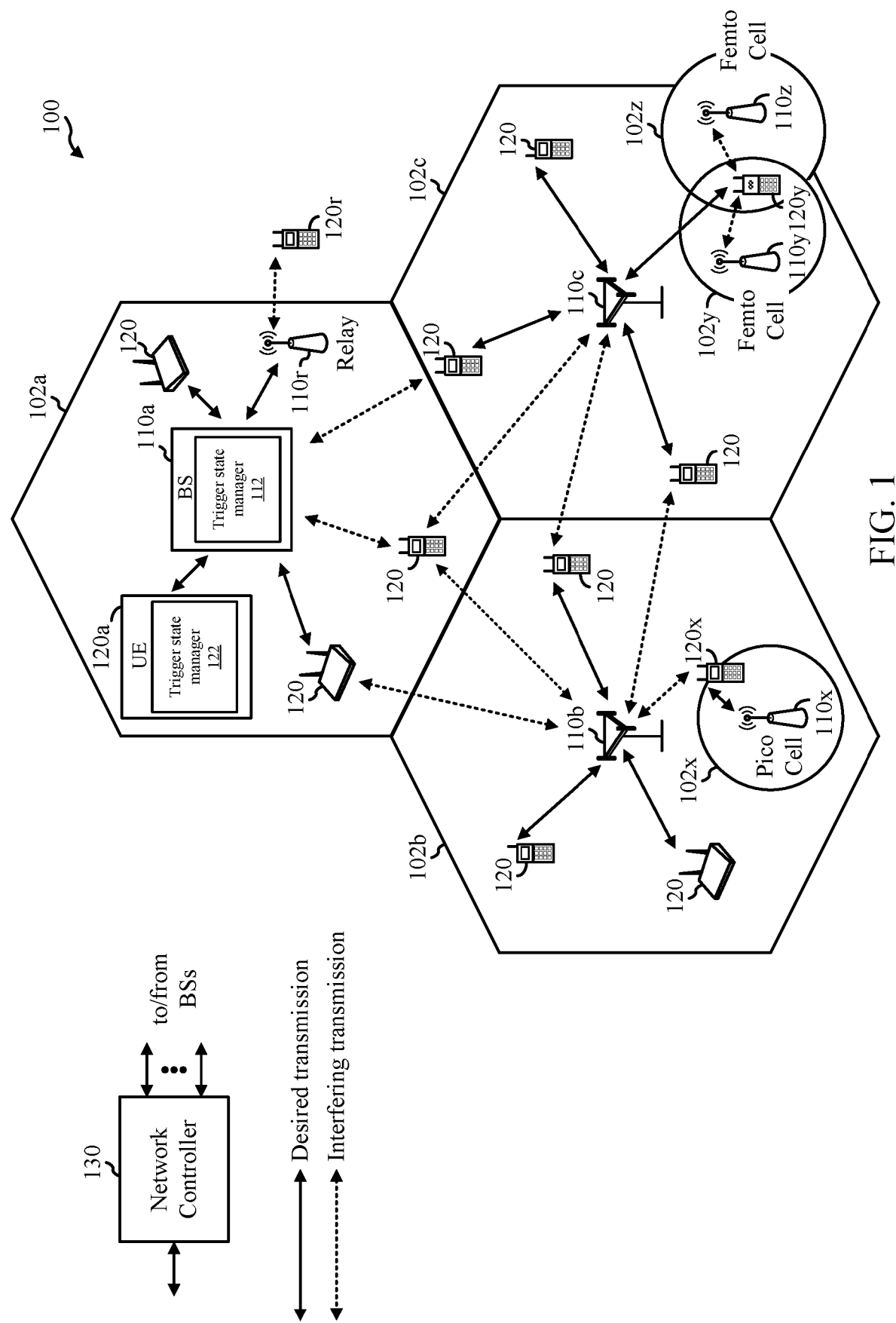
FIG. 1 is a block diagram conceptually illustrating an example telecommunications system, in accordance with certain aspects of the present disclosure.

Aspects of the present disclosure provide apparatus, methods, processing systems, and computer readable mediums for a user equipment (UE) indication of a number of supported trigger states.

In certain systems, such as new radio (e.g., 5G NR) systems, aperiodic channel state information reference signals (A-CSI-RS) are transmitted by the base station (BS). The UE uses the A-CSI-RS for CSI reporting. The BS configures the UE with one or more resource sets for the A-CSI-RS. The resource sets may include the same or different A-CSI-RS resources. The BS also configures the UE with aperiodic trigger states. Each trigger state triggers at least one of the configured A-CSI-RS resource sets. The BS also downselects the number of active trigger states from the configured trigger states. In some examples, the BS can configure the UE with 128 aperiodic trigger states and the BS may downselect to up to 64 active aperiodic trigger states (of the 128 configured). The BS may send downlink control information (DCI) indicating one or more of the active aperiodic trigger states.

For the same A-CSI-RS resource in the same resource set, the transmission configuration indicator (TCI) state (e.g., beam) may be different for different trigger states. Thus, different trigger states, including those that trigger one or more of the same A-CSI-RS resources, may be associated with different TCI states. Because the total number of active trigger states is determined by the BS (e.g., up to 64 active trigger states) with the same A-CSI-RS potentially having different TCI states for each trigger states, the UE may track (e.g., time and frequency tracking) many TCI states (e.g., up to 64 TCI states) for the same A-CSI-RS resource for dynamic beam indication/beam switch. In some examples, the UE may track the many TCI states simultaneously (e.g., at the same time, concurrently, or during an overlapping period of time). In this case, the UE may reserve memory for DCI based beam switch within up to all of the possible active beams (e.g., 64).

Therefore, what is needed are techniques for the UE to indicate its supported number of trigger states. Accordingly, aspects of the present disclose provide techniques for the UE to indicate its capability for the number of activated or configured aperiodic trigger states. The indicated number may be less than a total number of trigger states. The UE may provide the indication as UE capability information. In one example, the UE may provide the indication via radio resource control (RRC) or medium access control control element (MAC-CE) signaling. In one aspect, the UE may provide the indication per trigger type. In a further example, the UE may provide additional information to the BS associated with the supported number of trigger states.

The following description provides examples of a UE indication of supported trigger states, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. For clarity, while aspects may be described herein using terminology commonly associated with 5G wireless technologies, aspects of the present disclosure can be applied in other generation-based communication systems, such as later releases and technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

Certain wireless networks utilize orthogonal frequency division multiplexing (OFDM) on the downlink (and/or uplink) and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth.

In NR, an RB may be 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The cyclic prefix (CP) length also depends on the subcarrier spacing. In NR, a subframe is 1 ms, but the basic transmission time interval (TTI) may be referred to as a slot. A subframe contains a variable number of slots (e.g., 1, 2, 4, 8, 16, . . . slots) depending on the subcarrier spacing. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

FIG. 1 illustrates an example wireless communication network 100 in which aspects of the present disclosure may be performed. For example, the wireless communication network 100 may be an NR system (e.g., 5G NR network).

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS. In some examples, the BSs 110 may be interconnected to one another and/or to one or more other BSs or network nodes (not shown) in wireless communication network 100 through various types of backhaul interface (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE may be stationary or mobile.

As shown in FIG. 1, a UE 120a in the wireless communication network 100 includes a trigger state manager 122. The trigger state manager 122 may be configured to provide an indication to a BS 110a in the wireless communication network 100 of a number of aperiodic trigger states supported by the UE 120a. The trigger state manager 112 may be configured to receive a configuration or activation of one or more aperiodic trigger states from the BS 110a in accordance with the indication. As shown in FIG. 1, a BS 110a in the wireless communication network 100 includes a trigger state manager 112. The trigger state manager 112 may be configured to receive an indication from the UE 120a in the wireless communication network 100 of a number of aperiodic trigger states supported by the UE 120a. The trigger state manager 122 may be configured to provide the UE 120a a configuration or activation of one or more aperiodic trigger states in accordance with the indication.

Wireless communication network 100 may also include relay stations (e.g., relay station 110r), also referred to as relays or the like, that receive a transmission of data and/or other information from an upstream station (e.g., the BS 110a or the UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 2:
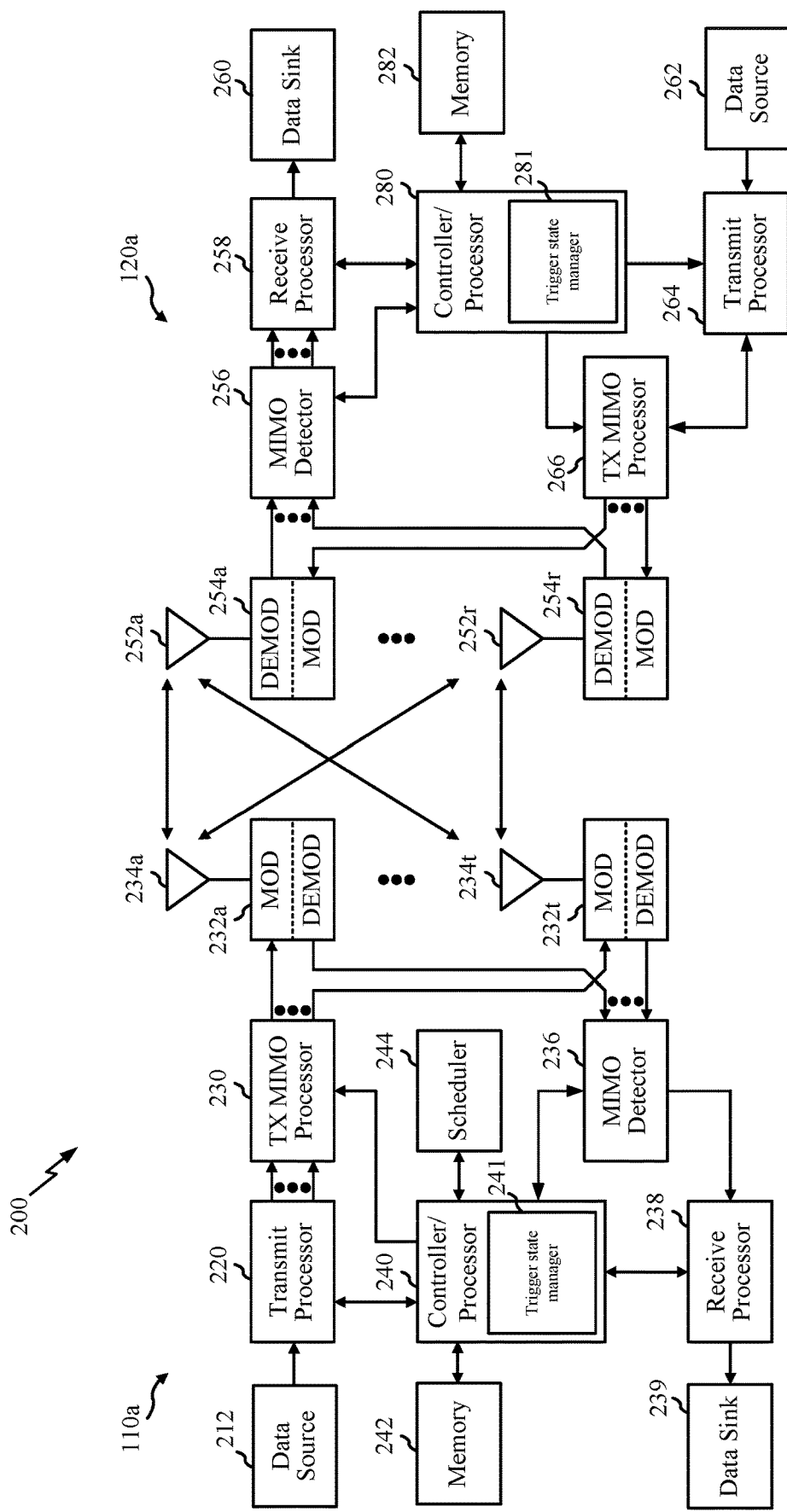
FIG. 2 is a block diagram conceptually illustrating a design of an example base station (BS) and user equipment (UE), in accordance with certain aspects of the present disclosure.

FIG. 2 illustrates example components of a BS and a UE, such as the BS 110a and UE 120a in the wireless communication network 100, which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-432t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-434t, respectively.

At the UE 120a, the antennas 252a-452r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The controllers/processors 240 and 280 may direct the operation at the BS 110a and the UE 120a, respectively. The processor 240 and/or other processors and modules at the BS 110a may perform or direct the execution of processes for the techniques described herein. The memories 242 and 282 may store data and program codes for BS 110a and UE 120a, respectively. A scheduler 244 may schedule UEs for data transmission on the downlink and/or uplink. For example, as shown in FIG. 2, the controller/processor 280 of the UE 120a includes a trigger state manager 281 that may be configured for a UE indication of supported number of trigger states, in accordance with certain aspects of the present disclosure. As shown, the controller/processor 240 of the BS 110a includes a trigger state manager 241 that may be configured for a UE indication of supported number of trigger states, in accordance with certain aspects of the present disclosure.

As discussed above, aspects of the present disclosure relate to an indication of UE supported number of trigger states. In certain systems (e.g., 5G NR systems), a user equipment (UE) is configured with uplink and downlink resources. For example, the UE may be configured with uplink resources for sounding reference signal (SRS) transmission (e.g., aperiodic SRS), physical uplink control channel (PUCCH) transmission, and/or physical uplink shared channel (PUSCH) transmission. The UE may be configured with downlink resources for physical downlink control channel (PDCCH) transmission, physical downlink shared channel (PDSCH) transmission, and/or channel state information (CSI) reference signals (RS), such as aperiodic CSI-RS (A-CSI-RS).

In some examples, the base station (BS) configures the UE with one or more resource sets for A-CSI-RS. The A-CSI-RS may be used by the UE for CSI reporting. For example, the UE can measure the A-CSI-RS to report CSI to the BS. The BS may configure the A-CSI-RS resource sets via higher layer signaling, such as radio resource control (RRC) signaling. The BS configures the UE with trigger states for triggering the configured A-CSI-RS resource sets. Each trigger state may configure at least one A-CSI-RS resource set. In some examples, the UE is configured with up to 128 aperiodic trigger states. In some cases, the BS may down select, or activate, a subset of up to 64 active trigger states, for example, via RRC or a medium access control (MAC) control element (CE). The BS may select the number of the subset trigger states, such 0, 2, 4, 8, 16, 32, or 64 trigger states.

The trigger states may be indicated via downlink control information (DCI). For example, the subset of trigger state may be mapped to DCI codepoints (e.g., via the RRC or MAC CE signaling) and the DCI can then select one or more of the trigger states to be used. The UE may monitor and measure A-CSI-RS from the BS and provide a CSI report to the BS, based on the A-CSI-RS resource set(s) associated with the selected trigger states. For the same A-CSI-RS resource in the same resource set, the transmission configuration indicator (TCI) state may be different for different trigger states. A-CSI-RS may update a spatial relation for other uplink resources, such as A-SRS, PUCCH, and/or PUSCH. A-CSI-RS may update quasi-colocation (QCL) information for other downlink resources, such as another A-CSI-RS, PDCCH, and/or PDSCH. In some examples, a given A-CSI-RS resource can be transmitted via up to 64 different beams.

Because the total number of active trigger states is determined by the BS (e.g., up to 64 active trigger states) with the same A-CSI-RS potentially having different TCI states for each trigger states, the UE may need to track (e.g., time and frequency tracking) many different TCI states (e.g., up to 64 TCI states) for the same A-CSI-RS resource for dynamic beam indication/beam switch. In some examples, the UE may track the many TCI states simultaneously (e.g., at the same time, concurrently, or during an overlapping period of time). In this case, the UE may reserve memory for DCI based beam switch within up to 64 possible active beams.

Therefore, what is needed are techniques for the UE to indicate its supported number of trigger states. Accordingly, aspects of the present disclose provide techniques for the UE to indicate its capability for the number of activated or configured aperiodic trigger states.

Example UE Indication of Supported Number of Trigger States

Figure 3:
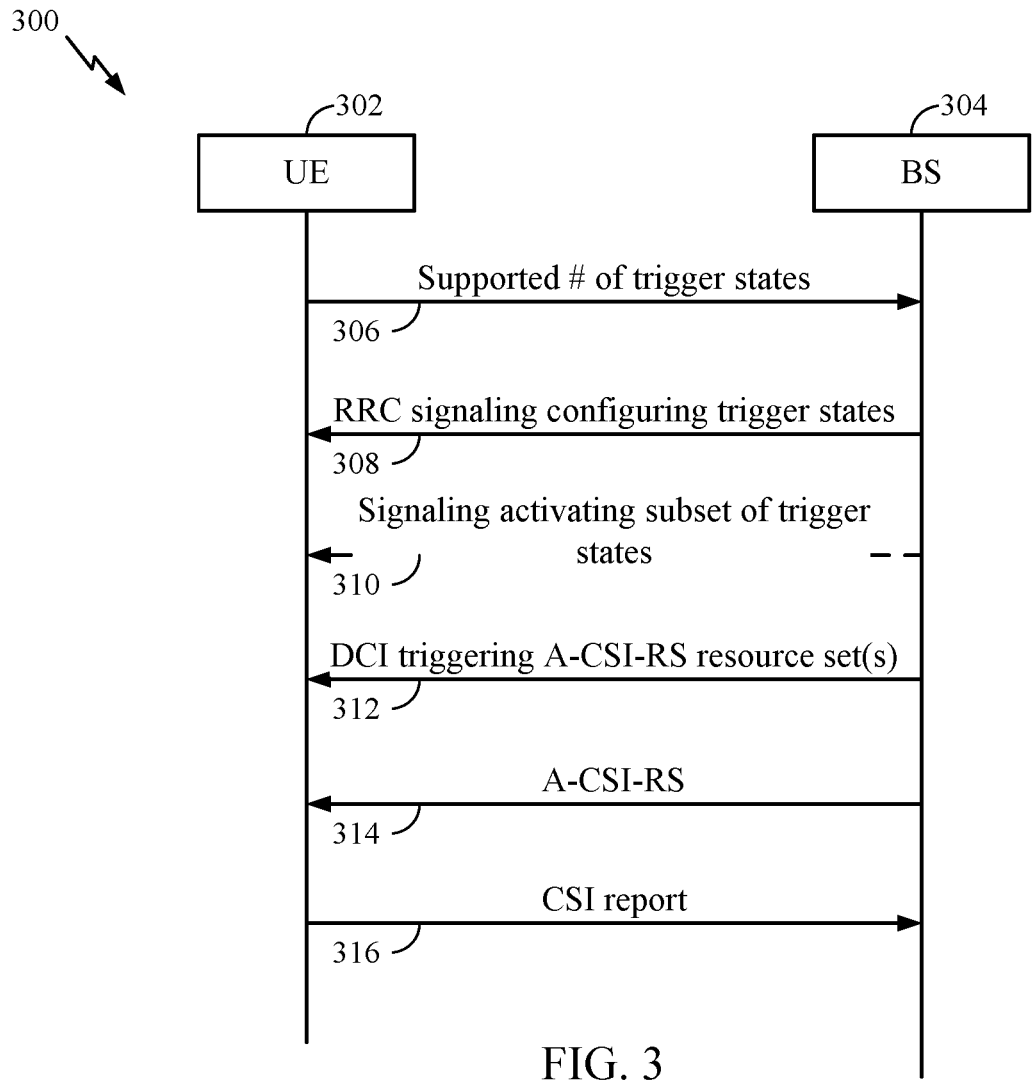
FIG. 3 is a call flow illustrating an example indication of UE number of supported trigger states, in accordance with certain aspects of the present disclosure.

FIG. 3 is a call flow 300 illustrating an example indication of the UE capability of the supported number of active trigger states. As shown in FIG. 3, at 306, the UE 302 can send the BS 304 an indication of the supported number of trigger states. For example, the UE 302 sends an indication of the maximum number of active A-CSI-RS trigger states that the UE supports (e.g., a requested number of active A-CSI-RS trigger states). At 308, the UE 302 is configured with a set of trigger states, for example, via higher layer RRC signaling. In some examples, the configured set of trigger states takes into account the number of supported trigger states indicated at 306 (e.g., is equal to less than the indicated number). At 310, the UE 302 may receive signaling activating a subset of the configured trigger states, for example, via lower layer signaling such as MAC-CE, or via RRC. In some examples, the configured set of trigger states takes into account the number of supported trigger states indicated at 306 (e.g., is equal to less than the indicated number). Although the UE indication of the supported number of trigger states at 306 is shown in FIG. 3 as before the configuration of the trigger states, in other examples, the UE indication could be provided after the configuration but before the activation at 310. At 312, the UE 302 may receive DCI from the BS 304 trigger one or more A-CSI-RS resource set(s), for example, by indicating/selecting one or more trigger states, of the activated subset of trigger states, associated with the one or more A-CSI-RS resource sets. The triggered A-CSI-RS resource sets may be used by the UE 302 and BS 304 for the A-CSI-RS and CSI reporting at 314 and 316, respectively.

Figure 4:
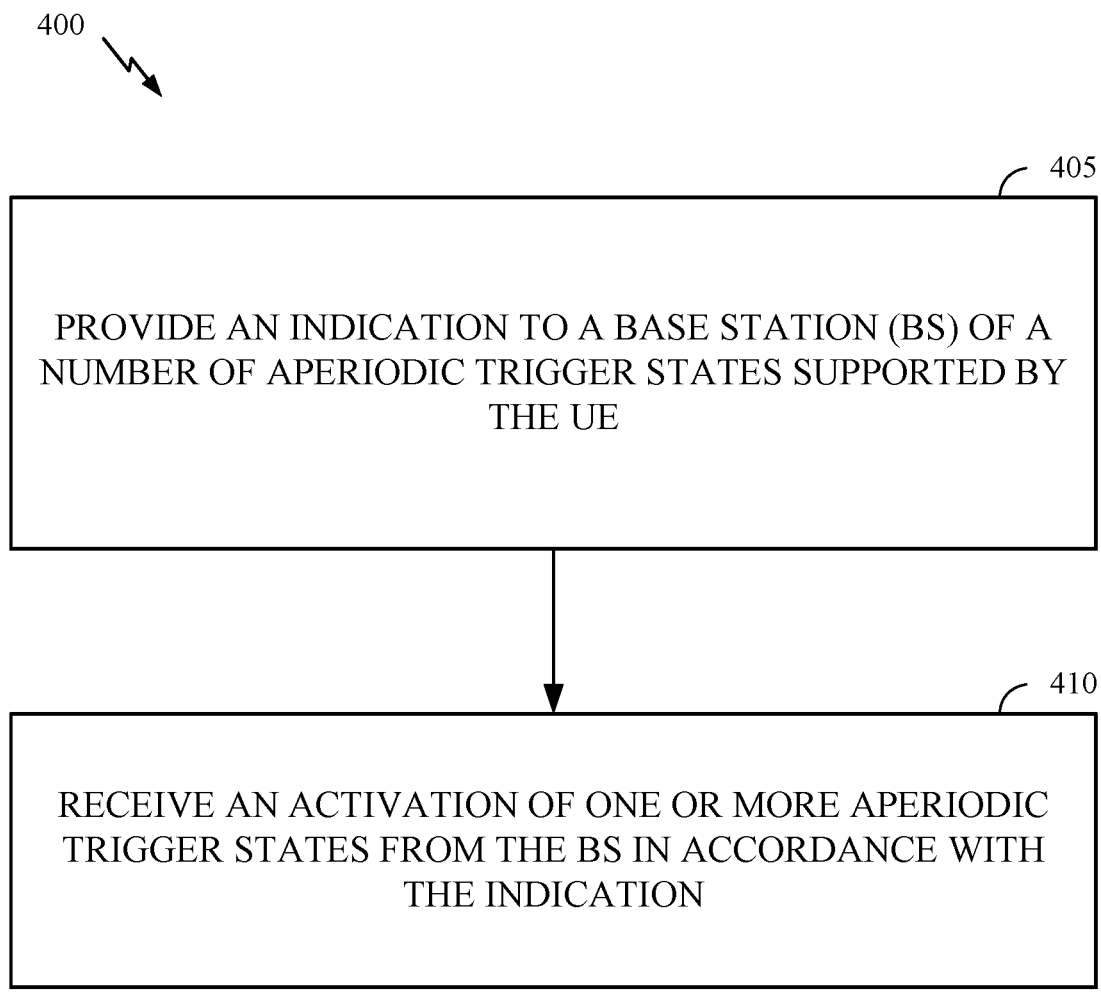
FIG. 4 is a flow diagram illustrating example operations by a UE for wireless communication, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by providing an indication to a BS of a number of aperiodic trigger states supported by the UE. In some examples, the number is equal to or less than 64 (e.g., 0, 2, 4, 8 . . . , 64). In some examples, the UE indicates a maximum number of active aperiodic trigger states supported by the UE. In some examples, the UE indicates a maximum number of configured aperiodic trigger states supported by the UE. Each aperiodic trigger state may trigger transmission of at least one A-CSI-RS resource set (e.g., when selected/indicated in a DCI).

In some examples, the UE provides the indication with UE capability information (e.g., as part of capability exchange). In some examples, the UE provides the indication via RRC signaling or a MAC-CE.

According to certain aspects, the UE provides the indication of the maximum number of aperiodic trigger states per trigger type. For example, the UE may provide the indication (e.g., only) for trigger states triggering A-CSI-RS to update QCL information and/or to update a spatial relation for other resources. In this case, the BS only limits the configuration or activation of this type of trigger state to within the indicated maximum number.

According to certain aspects, the UE may provide another indication of other aspects associated with the triggers. In some example, the other indication may be provided with the indication of the UE capability of the number of support aperiodic trigger states. In some examples, the other indication is provided for each trigger state or for all of the trigger states. In some examples, the other indication indicates a maximum number of supported report configurations per aperiodic trigger state (e.g., 16); a maximum number of total triggered A-CSI-RS resources; a maximum number of A-CSI-RS resources per resource set; and/or a maximum number of TCI states per A-CSI-RS resource or for all A-CSI-RS resources triggered by different active aperiodic trigger states, such as a maximum number of distinct QCL TypeD RS in TCI states.

A TCI state may indicate a quasi-co-location (QCL) relation/assumption. QCL assumptions generally refer to assumptions that, for a set of signals or channels considered to be QCL related (QCL'd), certain characteristics derived for (measured from) one of the signals or channels may be applied to the other. An antenna port is defined such that the channel over which a symbol on the antenna port is conveyed can be inferred from the channel over which another symbol on the same antenna port is conveyed. Two antenna ports are said to be QCL'd if properties of the channel over which a symbol on one antenna port is conveyed can be inferred from the channel over which a symbol on the other antenna port is conveyed. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters. In some cases, spatial QCL assumptions may be indicated, for example, by Type D. Spatial QCL may mean a (Tx or Rx) beam selected based on a certain signal measurement may be applied to the QCL related signal.

At 410, the UE receives an activation of one or more aperiodic trigger states from the BS in accordance with the indication. For example, the BS may limit the number of activated aperiodic trigger states based on the indicated UE capability (e.g., activates equal or less than the number of trigger states supported by the UE).

Figure 5:
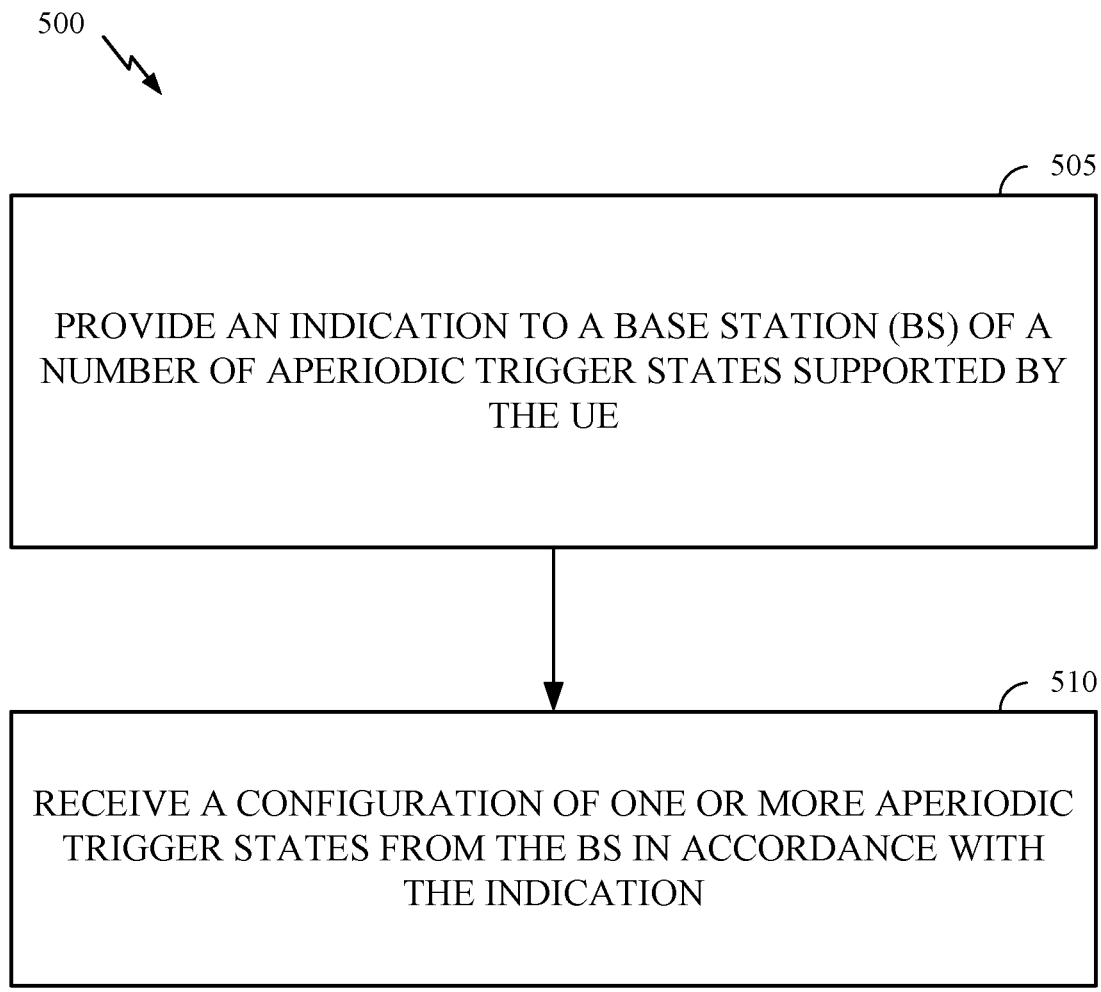
FIG. 5 is a flow diagram illustrating example operations by a BS for wireless communication, in accordance with certain aspects of the present disclosure.

In some examples, the UE receives a configuration of aperiodic trigger states from the BS in accordance with the indication, as shown in FIG. 5 at 505 and 510. For example, the BS may limit the number of configured aperiodic trigger states based on the indicated UE capability (e.g., configures equal or less than the number of trigger states supported by the UE).

Figure 6:
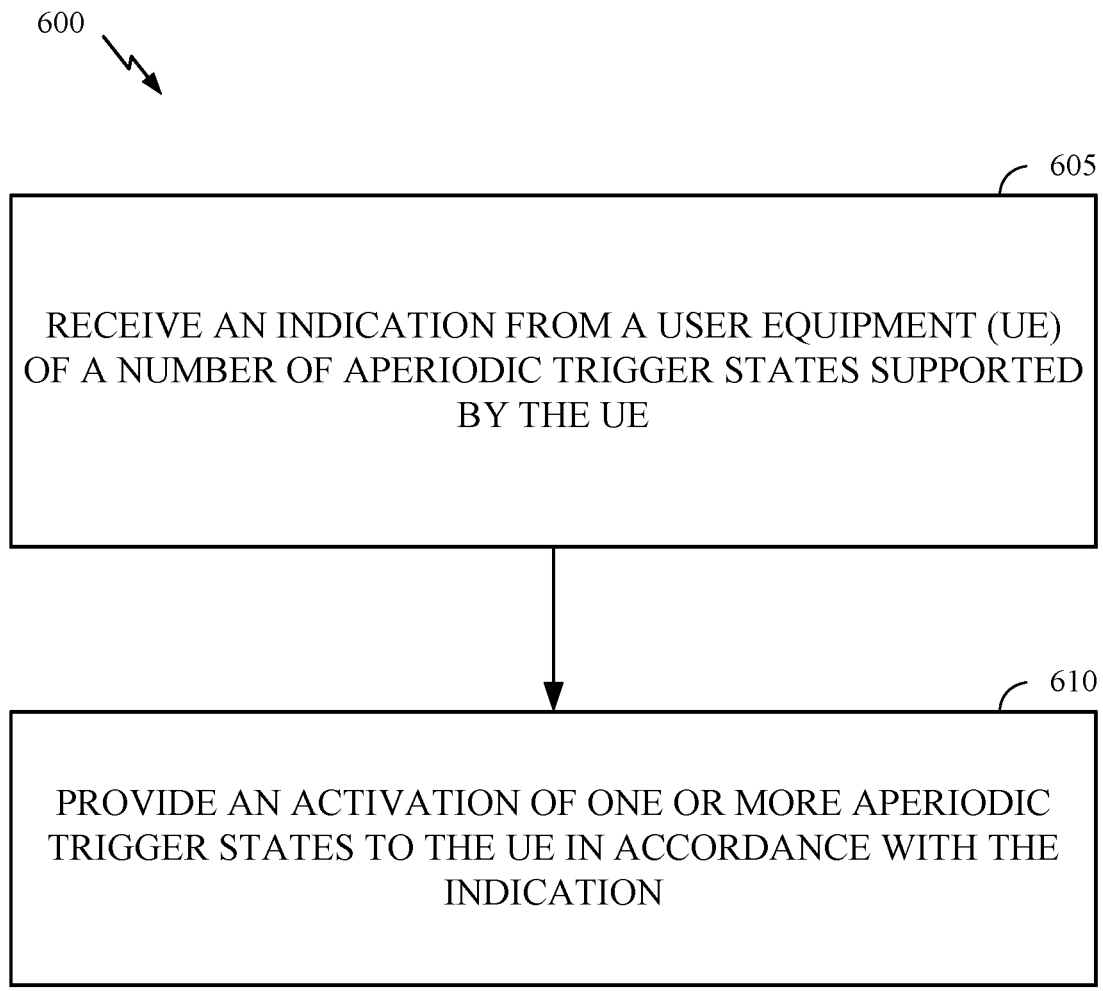
FIG. 6 is a flow diagram illustrating example operations by a UE for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as a BS 110a in the wireless communication network 100). The operations 600 may be complimentary operations by the BS to the operations 400 performed by the UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, by receiving an indication from a UE of a number of aperiodic trigger states (e.g., a maximum number of configured or activated) supported by the UE. In some examples, the indication is received with UE capability information. The indication may be received via RRC signaling or a MAC-CE.

At 610, the BS provides an activation of one or more aperiodic trigger states to the UE in accordance with the indication. In some examples, the BS activates a number of aperiodic trigger states equal to less than the indicated maximum number of activated aperiodic trigger states supported by the UE. In some examples, the BS activates equal to or less than an indicated number of supported trigger states per trigger type.

Figure 7:
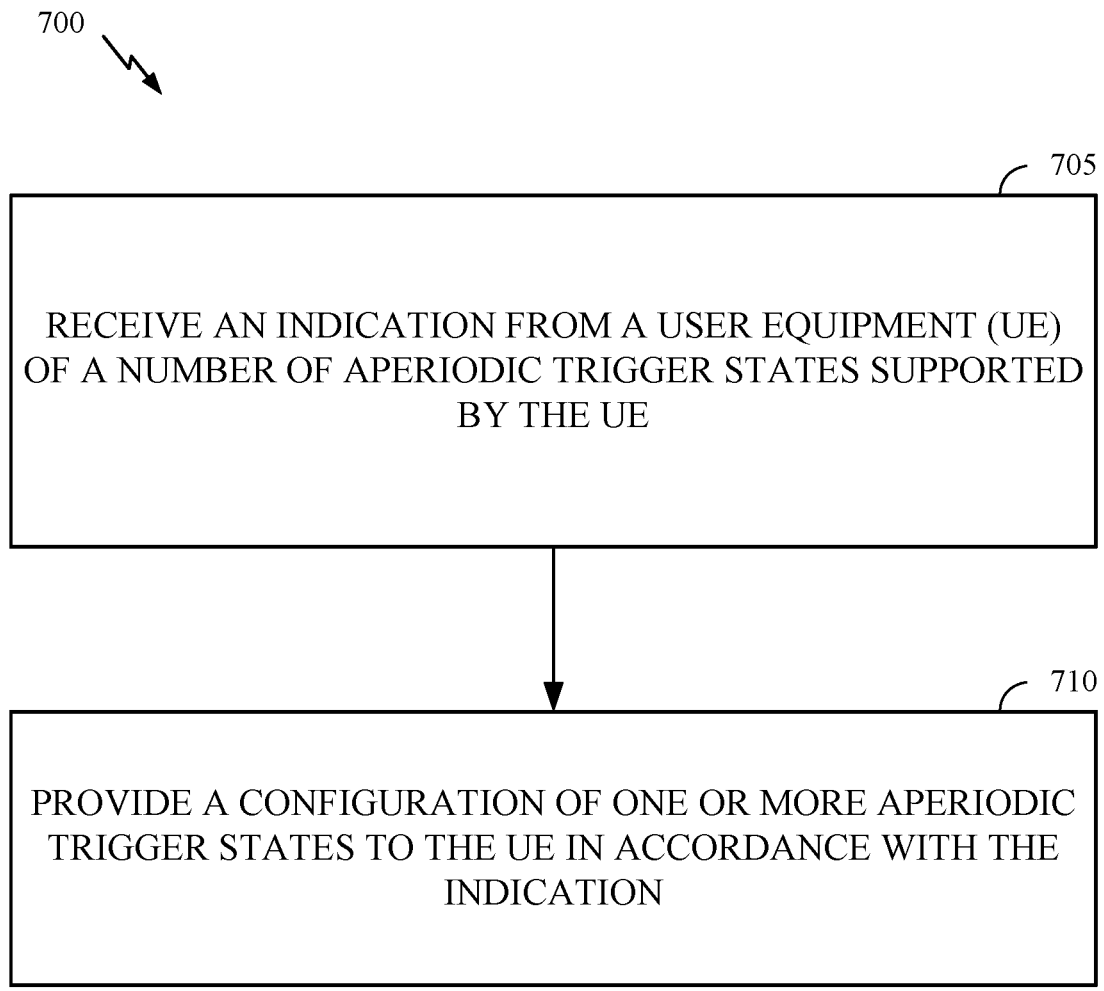
FIG. 7 is a flow diagram illustrating example operations by a BS for wireless communication, in accordance with certain aspects of the present disclosure.

In some examples, the BS provides a configuration of aperiodic trigger states from the BS in accordance with the indication, as shown in FIG. 7 at 705 and 710. In some examples, the BS configures a number of aperiodic trigger states equal to less than the indicated maximum number of configured aperiodic trigger states supported by the UE. In some examples, the BS configures equal to or less than an indicated number of supported trigger states per trigger type.

Figure 8:
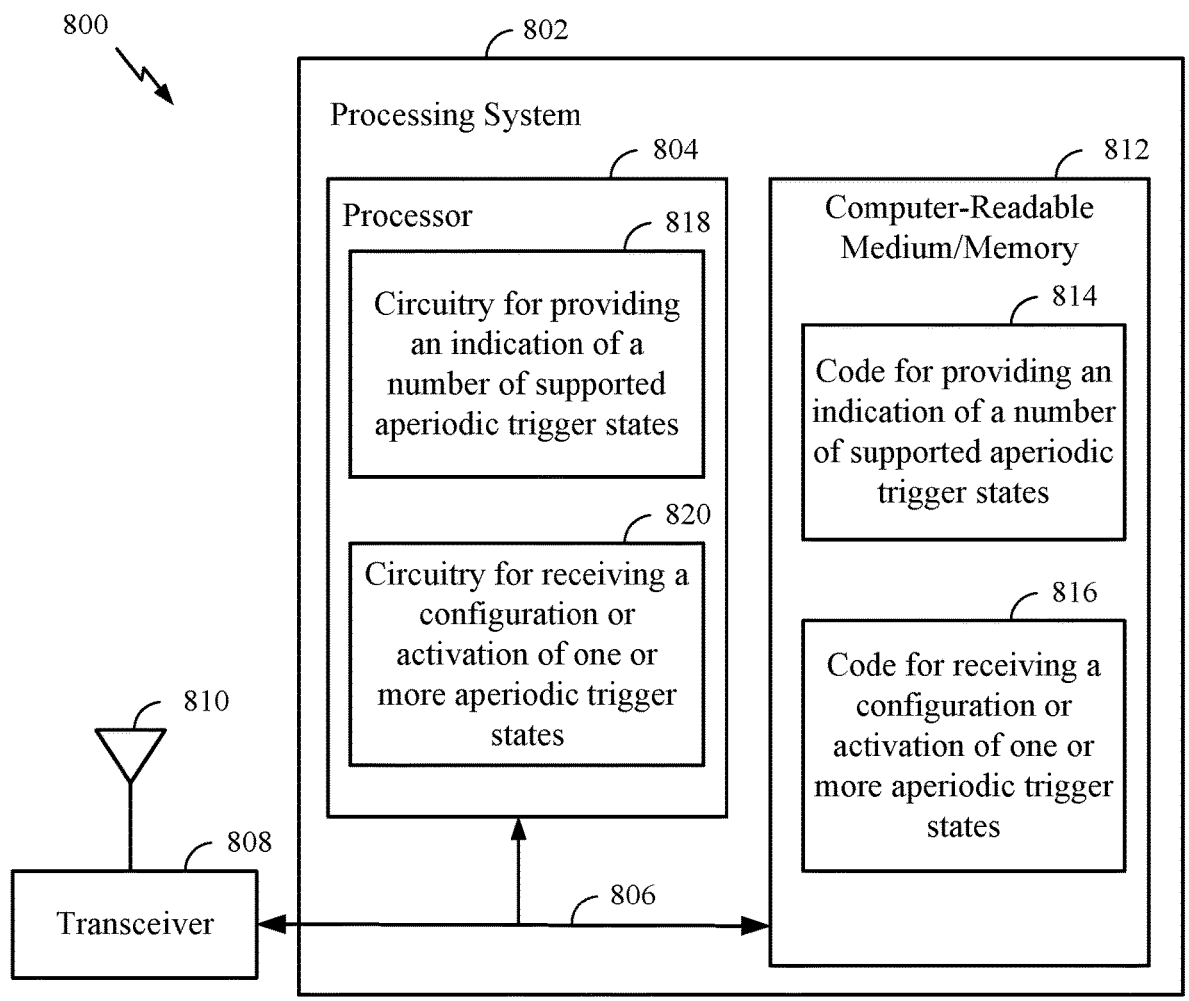
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 4 and/or FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 4 and/or FIG. 6, or other operations for performing the various techniques discussed herein for a UE indication of the UE capability for the maximum number of supported trigger states. In certain aspects, computer-readable medium/memory 812 stores code 814 for providing an indication of the number of supported aperiodic trigger states by a UE and code 816 for receiving a configuration or activation of one or more aperiodic trigger states in accordance with the indication. In certain aspects, the processor 804 has circuitry configured to implement the code stored in the computer-readable medium/memory 812. The processor 804 includes circuitry 818 for providing an indication of the number of supported aperiodic trigger states by a UE and circuitry 820 for receiving a configuration or activation of one or more aperiodic trigger states in accordance with the indication.

Figure 9:
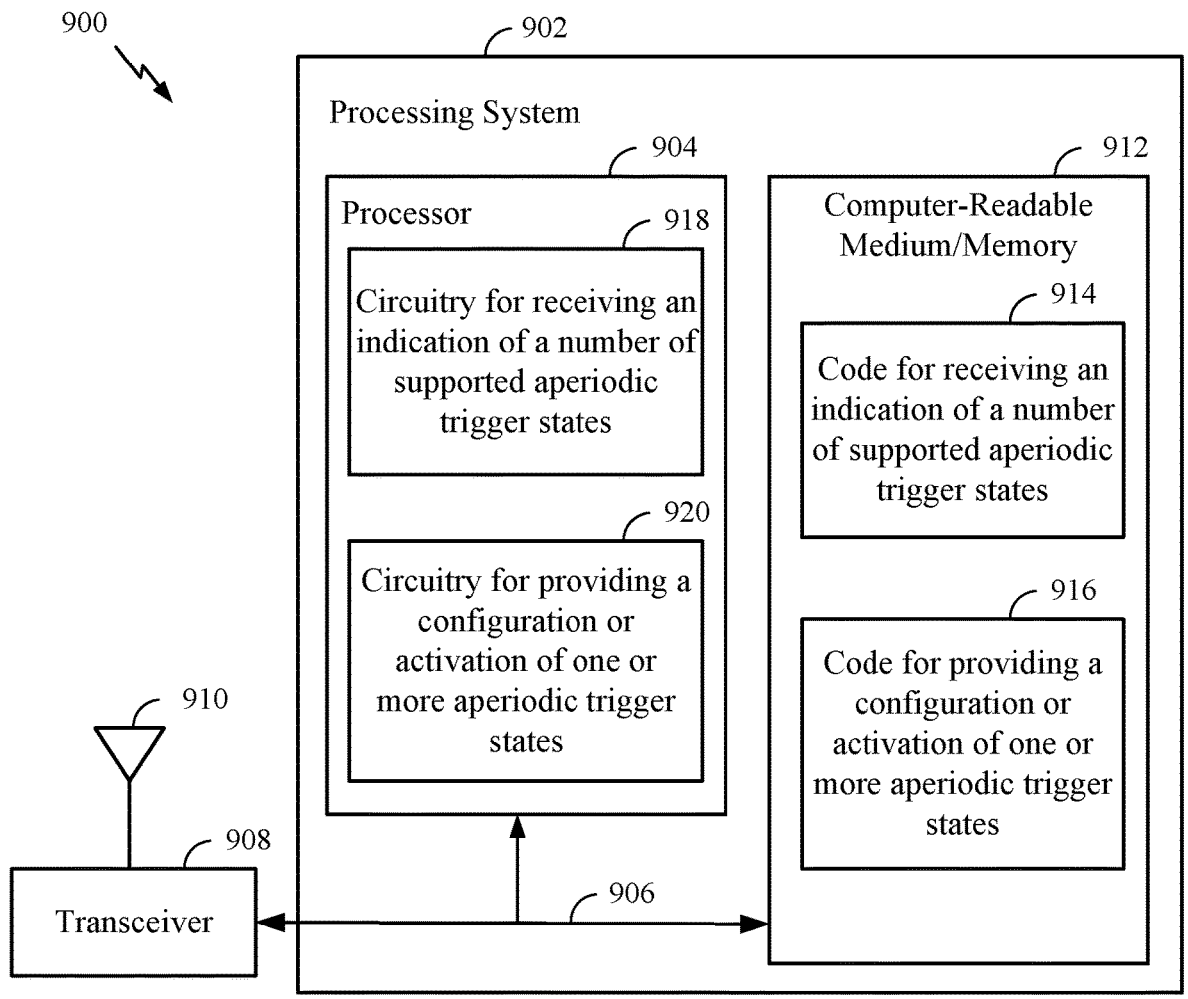
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5 and/or FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 5 and/or FIG. 7, or other operations for performing the various techniques discussed herein for a UE indication of the UE capability for the maximum number of supported trigger states. In certain aspects, computer-readable medium/memory 912 stores code 914 for receiving an indication of the number of supported aperiodic trigger states by a UE and code 916 for providing a configuration or activation of one or more aperiodic trigger states in accordance with the indication. In certain aspects, the processor 904 has circuitry configured to implement the code stored in the computer-readable medium/memory 912. The processor 904 includes circuitry 918 for providing an indication of the number of supported aperiodic trigger states by a UE and circuitry 920 for providing a configuration or activation of one or more aperiodic trigger states in accordance with the indication.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices. Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
providing an indication to a base station (BS) of a number of aperiodic trigger states supported by the UE, wherein the indication of the number of aperiodic trigger states includes an indication of a number of supported aperiodic trigger states per trigger type for a plurality of trigger types; and
receiving an activation of one or more aperiodic trigger states from the BS in accordance with the indication of the number of aperiodic trigger states.

2. The method of claim 1, wherein the indication of the number of aperiodic trigger states comprises an indication of a number of active aperiodic trigger states supported by the UE.

3. The method of claim 1, wherein the number of aperiodic trigger states is equal to 64.

4. The method of claim 1, wherein the plurality of trigger types comprise aperiodic trigger states triggering aperiodic channel state information reference signals (A-CSI-RS) that update quasi-colocation (QCL) information for one or more downlink resources, aperiodic trigger states triggering A-CSI-RS that update one or more spatial relations for one or more uplink resources, or both.

5. The method of claim 1, further comprising:
providing another indication to the BS that indicates a number of supported report configurations per aperiodic trigger state, number of total supported triggered aperiodic channel state information reference signal (A-CSI-RS) resources, a number of supported A-CSI-RS resources per resource set, a maximum number of transmission configuration indicator (TCI) states per A-CSI-RS resource, a number of supported TCI states for all A-CSI-RS resources triggered by different active aperiodic trigger states, or a combination thereof.

6. The method of claim 5, wherein the other indication is provided per aperiodic trigger state or for all of the aperiodic trigger states.

7. The method of claim 1, wherein the indication of the number of aperiodic trigger states is provided with UE capability information.

8. The method of claim 1, wherein the indication of the number of aperiodic trigger states is provided via radio resource control (RRC) signaling or a medium access control (MAC) control element.

9. The method of claim 1, wherein:
each aperiodic trigger state triggers transmission of at least one aperiodic channel state information reference signal (A-CSI-RS) resource set.

10. The method of claim 1, wherein:
the activation of the one or more aperiodic trigger states activates a subset of aperiodic trigger states of a set of aperiodic trigger states configured at the UE, and the subset of aperiodic trigger states is equal to or less than the indicated number of aperiodic trigger states supported by the UE.

11. The method of claim 1, wherein the number of aperiodic trigger states is less than 64.

12. A method for wireless communications by base station (BS), comprising:
receiving an indication from a user equipment (UE) of a number of aperiodic trigger states supported by the UE, wherein the indication of the number of aperiodic trigger states includes an indication of a number of supported aperiodic trigger states per trigger type for a plurality of trigger types; and
providing an activation of one or more aperiodic trigger states to the UE in accordance with the indication of the number of aperiodic trigger states.

13. The method of claim 12, wherein:
the indication of the number of aperiodic trigger states comprises an indication of a number of active aperiodic trigger states supported by the UE; and
providing the activation of the one or more aperiodic trigger states comprises activating a subset of aperiodic trigger states, from a set of configured aperiodic trigger states, that is equal to or less than the indicated number of aperiodic trigger states supported by the UE.

14. The method of claim 12, wherein the indicated number of aperiodic trigger states is equal to 64.

15. The method of claim 12, wherein the plurality of trigger types comprise aperiodic trigger states triggering aperiodic channel state information reference signals (A-CSI-RS) that update quasi-colocation (QCL) information for one or more downlink resources, aperiodic trigger states triggering A-CSI-RS that update one or more spatial relations for one or more uplink resources, or both.

16. The method of claim 12, further comprising:
receiving another indication from the UE that indicates a number of supported report configurations per aperiodic trigger state, a number of total supported triggered aperiodic channel state information reference signal (A-CSI-RS) resources, a number of A-CSI-RS resources supported per resource set, a number of supported transmission configuration indicator (TCI) states per A-CSI-RS resource, a number of supported TCI states for all A-CSI-RS resources triggered by different active aperiodic trigger states, or a combination thereof.

17. The method of claim 16, wherein the other indication is per aperiodic trigger state or for all of the aperiodic trigger states.

18. The method of claim 12, wherein the indication of the number of aperiodic trigger states is received with UE capability information.

19. The method of claim 12, wherein the indication of the number of aperiodic trigger states is received via radio resource control (RRC) signaling or a medium access control (MAC) control element.

20. The method of claim 12, wherein each aperiodic trigger state triggers transmission of at least one aperiodic channel state information reference signal (A-CSI-RS) resource set.

21. The method of claim 12, wherein the indicated number of aperiodic trigger states is less than 64.

22. An apparatus for wireless communications, comprising:
means for providing an indication to a base station (BS) of a number of aperiodic trigger states supported by the apparatus, wherein the indication of the number of aperiodic trigger states includes an indication of a number of supported aperiodic trigger states per trigger type for a plurality of trigger types; and means for receiving an activation of one or more aperiodic trigger states from the BS in accordance with the indication of the number of aperiodic trigger states.

23. An apparatus for wireless communications, comprising:

means for receiving an indication from a user equipment (UE) of a number of aperiodic trigger states supported by the UE, wherein the indication of the number of aperiodic trigger states includes an indication of a number of supported aperiodic trigger states per trigger type for a plurality of trigger types; and means for providing an activation of one or more aperiodic trigger states to the UE in accordance with the indication of the number of aperiodic trigger states.

24. An apparatus for wireless communications, comprising:

a memory; and at least one processor coupled with the memory, the memory and the processor configured to:

provide an indication to a base station (BS) of a number of aperiodic trigger states supported by the apparatus, wherein the indication of the number of aperiodic trigger states includes an indication of a number of supported aperiodic trigger states per trigger type for a plurality of trigger types; and receive an activation of one or more aperiodic trigger states from the BS in accordance with the indication of the number of aperiodic trigger states.

25. An apparatus for wireless communications, comprising:

a memory; and at least one processor coupled with the memory, the memory and the processor configured to:

receive an indication from a user equipment (UE) of a number of aperiodic trigger states supported by the UE, wherein the indication of the number of aperiodic trigger states includes an indication of a number of supported aperiodic trigger states per trigger type for a plurality of trigger types; and provide an activation of one or more aperiodic trigger states to the UE in accordance with the indication of the number of aperiodic trigger states.

26. A non-transitory computer readable medium having computer executable code stored for wireless communications, comprising:

code for providing an indication to a base station (BS) of a number of aperiodic trigger states supported by a user equipment (UE), wherein the indication of the number of aperiodic trigger states includes an indication of a number of supported aperiodic trigger states per trigger type for a plurality of trigger types; and code for receiving an activation of one or more aperiodic trigger states from the BS in accordance with the indication of the number of aperiodic trigger states.

27. A non-transitory computer readable medium having computer executable code stored for wireless communications, comprising:

code for receiving an indication from a user equipment (UE) of a number of aperiodic trigger states supported by the UE, wherein the indication of the number of aperiodic trigger states includes an indication of a number of supported aperiodic trigger states per trigger type for a plurality of trigger types; and code for providing an activation of one or more aperiodic trigger states to the UE in accordance with the indication of the number of aperiodic trigger states.

28. A method for wireless communications by a user equipment (UE), comprising:

providing an indication to a base station (BS) of a number of aperiodic trigger states supported by the UE; and receiving a configuration of one or more aperiodic trigger states from the BS in accordance with the indication.

29. A method for wireless communications by base station (BS), comprising:

receiving an indication from a user equipment (UE) of a number of aperiodic trigger states supported by the UE; and providing a configuration of one or more aperiodic trigger states to the UE in accordance with the indication.

* * * * *